(12) United States Patent
Sasaki et al.

(10) Patent No.: US 6,432,316 B1
(45) Date of Patent: Aug. 13, 2002

(54) METHOD OF MANUFACTURING THIN FILM MAGNETIC HEAD

(75) Inventors: Satoshi Sasaki; Shoji Terada, both of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/526,449

(22) Filed: Mar. 16, 2000

(30) Foreign Application Priority Data

Mar. 25, 1999 (JP) .......................................... P11-082367

(51) Int. Cl.[7] .................................................. C23F 1/04
(52) U.S. Cl. .............................. 216/22; 216/46; 216/66; 29/603.07; 29/603.13; 29/603.18
(58) Field of Search .............................. 216/22, 41, 46, 216/48, 66, 79; 29/603.07, 603.12, 603.13, 603.15, 603.17, 603.18

Primary Examiner—Randy Gulakowski
Assistant Examiner—Allan Olsen
(74) Attorney, Agent, or Firm—Sonnenschein, Nath & Rosenthal

(57) ABSTRACT

The track width of the upper layer pole of a thin film magnetic head is formed with an enhanced level of precision. A plating underlay film 20 is formed on a sixth non-magnetic layer 16 and then an upper layer pole 14a is formed thereon by means of a frame plating technique. Then, a first resist film 22 is formed on one of the opposite lateral sides of the upper layer pole 14a and an etching operation is conducted on the upper layer pole 14a. Thereafter, the first resist film 22 is removed and a second resist film 23 is formed on the other lateral side and a similar etching operation is conducted on the upper layer pole 14a.

8 Claims, 9 Drawing Sheets

PLANE VIEW

METHOD OF MANUFACTURING THIN FILM MAGNETIC HEAD

RELATED APPLICATION DATA

The present application claims priority to Japanese Application No. P11-082367 filed Mar. 25, 1999 which application is incorporated herein by reference to the extent permitted by law.

BACKGROUND OF THE INVENTION

1. Field of the Invention

This invention relates to a method of manufacturing a thin film magnetic head prepared by laying the components of the head device to produce a multilayer structure by means of a thin film forming process. More particularly, it relates to a method of manufacturing a thin film magnetic head having an upper layer pole for restricting the track width.

2. Prior Art

A magnetic head as described herein refers to a head typically mounted on a magnetic recording/reproducing apparatus such as a hard disk apparatus in order to record a recording signal to and/or reproduce a recording signal from a magnetic recording medium. A bulk-type magnetic head prepared by winding a wire coil around a magnetic core is typically used for such a magnetic head. However, a bulk-type magnetic head provides certain limits to micro-machining operations and it is difficult to down-size the magnetic head in order to make it adapted to high density signal recording.

In an attempt for avoiding this problem, there have been proposed so-called thin film magnetic heads prepared by way of a thin film forming process of sequentially laying a lower core layer, a non-magnetic layer and an upper core layer on a substrate to form a multilayer structure. Such a thin film magnetic head can be down-sized and is still adapted to high density signal recording because the components of the head are formed through a thin film forming process.

When preparing a thin film magnetic head, an upper layer pole is formed at an end of the sliding surface thereof where a magnetic recording medium is to be slid before forming the upper core layer on the non-magnetic layer. As a result, the width of the track to be used for signal recording/reproduction is defined by the upper layer pole of the thin film magnetic head so that it can be accurately and finely finalized.

When forming the upper layer pole, firstly a plating underlay film is formed on the non-magnetic layer lying on the lower core layer and then a frame-like photoresist layer is formed on the plating underlay film. Subsequently, a plating operation is conducted and the photoresist layer is removed to produce the upper layer pole.

Meanwhile, there is an ever-increasing demand for thin film magnetic head showing a smaller track width that by turn meets the demand for high recording density in recent years. However, since the plating solution for forming the upper layer pole by means of the above described known thin film magnetic head manufacturing method is hydrophobic in terms of resist, there is an insurmountable limit for the attempt of reducing the track width by reducing the width of the upper layer pole. A technique of chemically coarsening the surface of the resist layer may be used to improve the hydrophilicity thereof before proceeding to the plating operation in the step of forming the upper layer pole with the above known manufacturing method, it has been nonetheless impossible to reduce the minimal width of the upper layer pole to less than 1 $\mu$m if the accuracy of the chemical composition and that of the dimensions of the upper layer pole are to be held to a satisfactory level.

In an attempt for further reducing the minimal width of the upper layer pole, two techniques have been proposed to date as described below. With the first proposed technique, after forming the upper layer pole, it is trimmed by means of an FIB (focussed ion beam). With the second proposed technique, after forming a relatively wide upper layer pole, it is trimmed by etching it from the sliding surface thereof where a magnetic recording medium is to be slid, using a mask pattern in the slider-processing step.

However, with the first proposed technique, since a large number of thin film magnetic heads formed on a common substrate have to be treated on a one by one basis, it is difficult to improve the precision level of treating the thin film magnetic heads in terms of dimensions and profile and that of aligning the recording head and the reproducing head laid one on the other for the thin film magnetic head. Additionally, the first proposed technique is rather time consuming and hence it is difficult to improve the productivity of manufacturing magnetic heads with the technique. More specifically, if the processing time per thin film magnetic head is 10seconds and a total of 7,000 thin film magnetic heads are formed on a single common substrate, about 20 hours will be required to process all the thin film magnetic heads.

On the other hand, with the above described second technique, it is difficult to improve the precision level of aligning a mask formed on a head rover and reproducibility of the accuracy of the mask profile in the slider processing step. Additionally, with the second technique, the surface a magnetic recording medium is to be slide shows a U-shaped cross section. Thus, foreign objects can become deposited in the recess of a magnetic head prepared with the second technique to eventually corrode the upper layer pole.

BRIEF SUMMARY OF THE INVENTION

In view of the above described circumstances, it is therefore the object of the present invention to provide a method of manufacturing a thin film magnetic head adapted to high density recording by forming the upper layer that defines the track width with an enhanced level of precision in terms of the width and also adapted to improve the manufacturing productivity.

According to the invention, the above object is achieved by providing a method of manufacturing a thin film magnetic head by sequentially forming at least a lower core layer, a non-magnetic layer and an upper core layer having an upper layer pole defining the track width on a substrate and subsequently forming a magnetic gap between said lower core layer and said upper layer pole, said method comprising:

an upper layer pole forming step of forming a lower core layer and a non-magnetic layer on a substrate and forming an upper layer pole thereon with a profile wider than the designed track width;

a first etching step of forming a first mask covering one of the lateral sides of said upper layer pole along the track and etching the other lateral side exposed from the mask; and a second etching step of forming the lateral side etched in said first etching step and etching the lateral side opposite to it;

said upper layer pole being made to have the intended track width.

With the above described method of manufacturing a thin film magnetic head, the upper layer pole for defining the track wide can be formed with an enhanced level of dimensional accuracy particularly in terms of the width along the track. Additionally, since the profile of the upper layer pole is finely treated by etching, a large number of thin film magnetic head formed on a single common substrate can be treated at the same time.

As described above, with a method of manufacturing a thin film magnetic head according to the invention, it is possible to form the upper layer pole with an enhance level of dimensional accuracy particularly in terms of the width along the track by sequentially etching the two lateral sides of the upper layer pole along the track. Additionally, since the profile of the upper layer pole is treated in a resist film forming step and an etching step, a large number of thin film magnetic heads formed on a single common substrate can be treated at the same time. Thus, with a method of manufacturing a thin film magnetic head according to the invention, it is now possible to manufacture a large number of high precision thin film magnetic heads adapted to high density recording on a mass production basis.

DETAILED DESCRIPTION OF THE INVENTION

Figure 1:
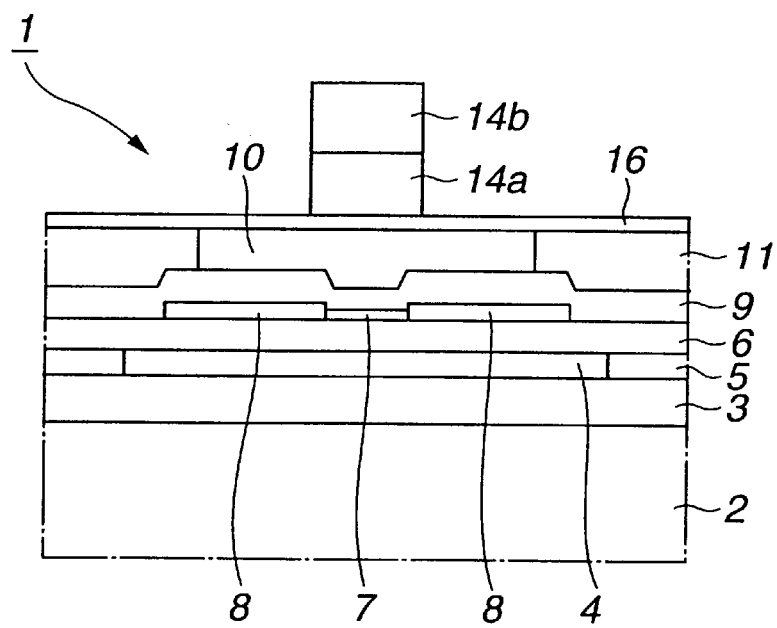
FIG. 1 is an enlarged schematic partial view of a thin film magnetic head according to the invention, showing a principal portion at an end face thereof.
Figure 2:
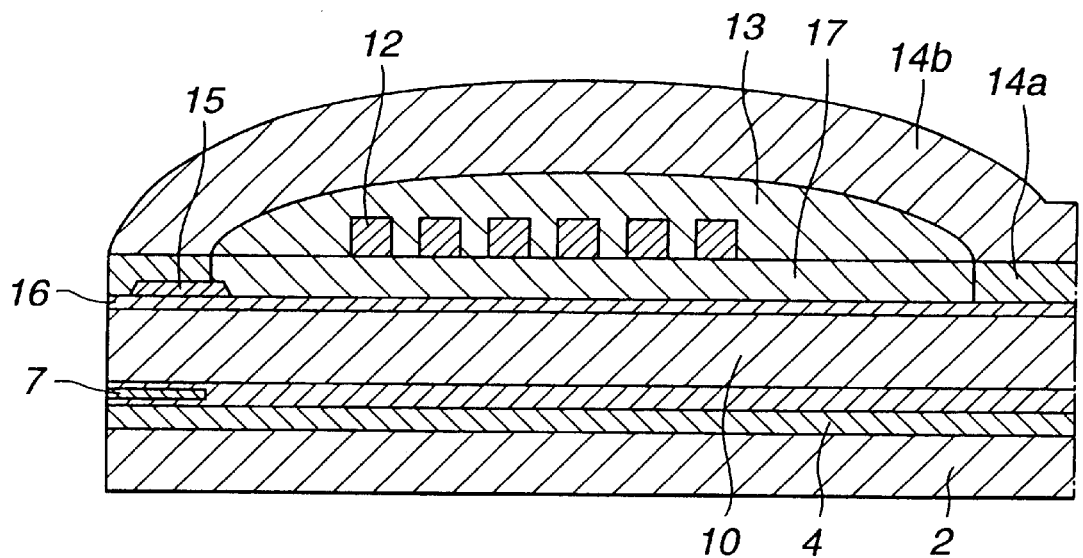
FIG. 2 is an enlarged schematic partial cross sectional view of the thin film magnetic head of FIG. 1, showing a principal portion thereof.

Now, the present invention will be described in greater detail by referring to the accompanying drawings that illustrate preferred embodiments of the invention. The method of the present invention can be applicable to manufacturing a thin film magnetic head 1 (hereinafter referred to as thin film head 1) as shown in FIGS. 1 and 2. Therefore, firstly, a thin film head 1 to be manufactured by the method of the present invention will be discussed below.

The thin film head 1 is formed by using a thin film forming step and comprises a substantially flat substrate 2 made of a hard non-magnetic material such as ALTIC (alumina-titanium-carbide), a reproduction head for reproducing signals recorded on a magnetic recording medium by utilizing the magnetoresistance effect and an inductance type recording head formed on the reproduction head for recording signals on a magnetic recording medium.

The reproduction head comprises a first non-magnetic layer 3 formed on the substrate 2, a lower magnetic shield layer 4 and a second non-magnetic layer 5 formed on the first non-magnetic layer 3 and having a substantially same height, a third non-magnetic layer 6 formed on the lower magnetic shield layer 4 and the second non-magnetic layer 5, a magnetoresistance effect element 7 (hereinafter referred to as MR element 7) and a pair of electrodes 8 formed on the third non-magnetic layer 6 and a fourth non-magnetic layer 9 formed on the third non-magnetic layer 6.

On the other hand, the recording head comprises an intermediary magnetic shield layer 10 and a fifth non-magnetic layer 11 formed on the fourth non-magnetic layer 9, a sixth non-magnetic layer 16 formed on the intermediary magnetic shield layer 10 and the fifth non-magnetic layer 11, a depth limiting film 15 and a seventh non-magnetic layer 17 formed on the sixth non-magnetic layer 16, a thin film coil 12 formed on the seventh non-magnetic layer 17 and an upper magnetic core layer 14 formed substantially at the center of the thin film coil 12 and substantially held in contact with the intermediary magnetic shield layer 10.

Of the thin film head 1, the components of the reproduction head and those of the recording head are arranged substantially flush with each other and exposed to the outside to produce a sliding surface where a recording medium is to be slid. Thus, a magnetic recording medium is made to slide on the surface of the thin film head 1 in order to record a signal on or reproduce a signal from the magnetic recording medium. In the reproduction head, the MR element 7 has such a structure that a sense current is fed in parallel with the sliding surface thereof where a magnetic recording medium is to be slid. In other words, it has a profile referred to as vertical type MR head.

Of the thin film head 1, on the other hand, the magnetic core of the recording head is formed by the intermediary magnetic shield layer 10 and the upper magnetic core layer 14 and the sixth non-magnetic layer 16 is arranged between the intermediary magnetic shield layer 10 and the upper magnetic core layer 14 to produce a magnetic gap on the sliding surface where a magnetic recording medium is to be slid. In other words, in the thin film head 1, the intermediary magnetic shield layer 10 and the upper magnetic core layer 14 respectively constitute the lower core and the upper core of the recording head.

Of the thin film head 1, the width of the side of the upper magnetic core layer 14 exposed to the sliding surface defines the track width. Therefore, the upper magnetic core layer 14 is constituted by an upper layer pole 14a having small dimensions and formed at the side of the sliding surface and a back yoke 14b held in contact with the upper layer pole 14a. With this arrangement, the track width is highly accurately defined by the thin film head 1. Additionally, the depth limiting film 15 of the thin film head 1 is arranged at the rear end side of the upper layer pole 14a as viewed from the sliding surface in order to limit the depth of the magnetic gap.

When reproducing a signal recorded on a magnetic recording medium by means of the thin film head 1, the MR element 7 of the thin film head 1 having the above described configuration is fed with a sense current from a power source (not shown) by way of the pair of electrodes 8. Additionally, the voltage of the MR element 7 is detected by a detection mechanism (not shown). Since the MR element 7 is a film structure showing a magnetoresistance effect, its resistance varies as a function of the magnetic field of the signal from the magnetic recording medium. Therefore, as a sense current is fed to the MR element 7 of the thin film head 1, the voltage of the MR element 7 changes as a function of its resistance. Thus, the thin film head 1 can detect the magnetic field of the signal from the magnetic recording medium by detecting changes in the voltage of the MR element 7.

When, on the other hand, recording a magnetic signal on a magnetic recording medium by means of the thin film head 1, the thin film coil 12 of the recording head of the thin film head 1 is fed with a current representing the signal to be recorded. Then, a magnetic flux is made to flow to the magnetic core comprising the intermediary magnetic shield layer 10 and the upper magnetic core layer 14 by the magnetic field generated by the thin film coil 12. As a result, a leak magnetic field is generated in the magnetic gap formed by the intermediary magnetic shield layer 10, the sixth magnetic layer 16 and the upper magnetic core layer 14 of the thin film head 1. Then, the thin film head 1 records the magnetic signal by applying the leak magnetic field to the magnetic recording medium.

Now, the method of manufacturing a thin film head 1 having a configuration as described above will be discussed below. Note that, while the thin film components of the thin film head 1, their materials, their sizes, their thicknesses and the techniques for forming the thin film components will be described by way of examples, the present invention is by no means limited to them.

When manufacturing the thin film head 1, firstly a substantially flat substrate is prepared by using a hard non-magnetic material such as ALTIC and the principal surface of the substrate is mirror-polished. The substrate remains as the substrate 2 of the final product of thin film head 1 and the remaining components of the thin film head 1 will be sequentially formed on the principal surface thereof by means of thin film forming processes.

Then, a first non-magnetic layer 3 is formed on the entire principal surface of the substrate. The first non-magnetic layer 3 is formed typically by sputtering using a non-magnetic insulating material such as $Al_2O_3$ or $SiO_2$. In this embodiment, after forming the thin film of the first non-magnetic layer 3, it is subjected to a polishing process to make the surface mirror-smooth.

Then, a lower magnetic shield layer 4 is formed on the first non-magnetic layer 3. The lower magnetic shield layer 4 is typically made of a metal material such as sendust (Fe—Al—Si alloy), Fe—Si—Ru—Ga alloy or Fe—Ta—N alloy. Te lower magnetic shield layer 4 is formed with a predetermined width vertically toward the sliding surface where a recording medium is to be slid. More specifically, a sendust film will be formed to a thickness of about 3 to 5 $\mu$m and, after forming a resist pattern, the lower magnetic shield layer 4 is produced by removing any unnecessary sendust, using a dry etching technique.

Thereafter, a second non-magnetic layer 5 is formed on the entire surface of the first non-magnetic layer 3 that carries the lower magnetic shield layer 4 thereon. As in the case of the first non-magnetic layer 3, the second non-magnetic layer 5 is made of a non-magnetic insulating material. Then, the second non-magnetic layer 5 is polished to expose the lower magnetic shield layer 4 buried under the second non-magnetic layer 5 until the lower magnetic shield layer 4 becomes flush with the second non-magnetic layer 5.

Then, a third non-magnetic layer 6 is formed on the entire surface of the lower magnetic shield layer 4 and the second non-magnetic layer 5 that are flush with each other. As in the case of the first non-magnetic layer 3, the third non-magnetic layer 6 is made of a non-magnetic insulating material.

Then, an MR element 7 is formed on the third non-magnetic layer 6 by means of a thin film forming technique such as sputtering. More specifically, the MR element 7 is produced by sequentially laying an about 5 nm thick Ta layer, an about 43 nm thick Ni—Fe—Nb layer, an about 5 nm thick Ta layer, an about 40 nm thick Ni—Fe layer and an about 1 nm thick Ta layer by sputtering. Note that the materials and the film thicknesses of the component layers of the MR element 7 are by no means limited to those listed above. In other words, any appropriate materials and film thicknesses may be selected depending on the application of the thin film head 1.

The MR element 7 is made to show a substantially rectangular contour whose longer sides are running along the respective lateral sides of the sliding surface where a magnetic recording medium is made to slide. Additionally, the length of the longer sides of the MR element 7 is so selected as to be smaller than the width of the lower magnetic shield layer 4.

A pair of thin film electrodes 8 are formed at the opposite ends of the MR element 7. The electrodes 8 are formed by means of an appropriate film forming technique such as evaporation or sputtering, using an electrically conductive material. Additionally, the electrodes 8 are made to show a substantially rectangular contour whose longer sides are running in a direction perpendicular to the longitudinal direction of the MR element 7 at the opposite ends of the MR element 7.

Subsequently, an intermediary magnetic shield layer 10 is formed on the fourth non-magnetic layer 9 by means of an appropriate technique such as plating or sputtering, using a material showing good soft magnetic characteristics such as Ni—Fe alloy. The intermediary magnetic shield layer 10 is made to have a width greater than the longitudinal length of the MR element 7 relative to the sliding surface where a magnetic recording medium is made to slide.

Thereafter, a fifth non-magnetic layer 11 is formed on the entire surface of the fourth non-magnetic layer 4 carrying the intermediary magnetic shield layer 10 thereon. As in the case of the first non-magnetic layer 3, the fifth non-magnetic layer 11 is made of a non-magnetic insulating material. After forming the fifth non-magnetic layer 11, it is subjected to a polishing process to expose the intermediary magnetic shield layer 10 buried under the fifth non-magnetic layer 11 until the fifth non-magnetic layer 11 becomes flush with the intermediary magnetic shield layer 10.

Then, a sixth non-magnetic layer 16 is formed on the entire surface of the intermediary magnetic shield layer 10 and the fifth non-magnetic layer 11 that are flush with each other. As in the case of the first non-magnetic layer 3, the sixth non-magnetic layer 16 is made of a non-magnetic insulating material. Preferably, the sixth non-magnetic layer 16 is made of $SiO_2$. Then, the sixth non-magnetic layer 16 can be subjected to a high precision etching process in the step of forming an upper layer pole 14a, which will be described hereinafter. Thereafter, the sixth non-magnetic layer 16 is removed from a central portion of a thin film coil 12, which will also be described hereinafter.

Then, a depth limiting film 15 is formed at a position slightly receding from the sliding surface where a magnetic recording medium is made to slide by using a non-magnetic material. The depth limiting film 15 operates to improve the efficiency of generating a leak magnetic field from coming from the magnetic gap by limiting the depth of the magnetic gap from the sliding surface.

Then, an upper layer pole 14a is formed on the sixth non-magnetic layer 16 by using a material showing excellent soft magnetic characteristics. Now, the step of forming the upper layer pole 14a will be discussed by referring to FIGS. 3 through 7. Note that, when the thin film head 1 is polished to line B—B in FIG. 3 or line D—D in FIG. 4 in a subsequent step, the cross sectional surface exposed by the polishing operation is made ready to operate as sliding surface. Then, the thin film head 1 will show a final profile as shown in FIGS. 1 and 2.

Figure 3A:
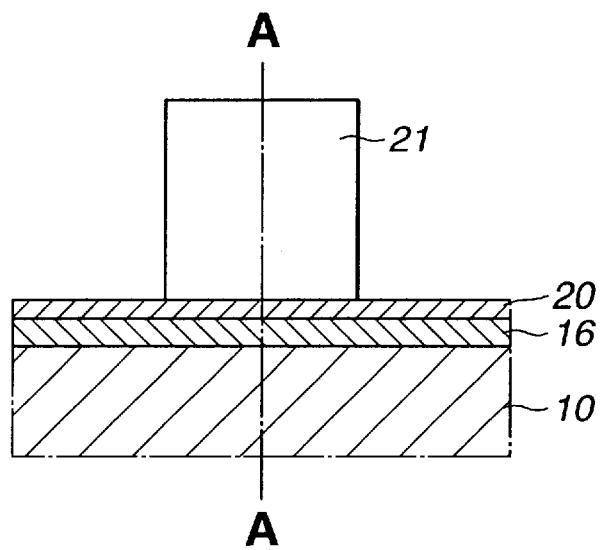
FIG. 3 is schematic views of the thin film magnetic head of FIG. 1, illustrating a frame resist formed in the upper layer pole forming step, of which (a) is a view seen from the sliding surface side and (b) is a cross sectional view taken along line A—A in (a).
Figure 3B:
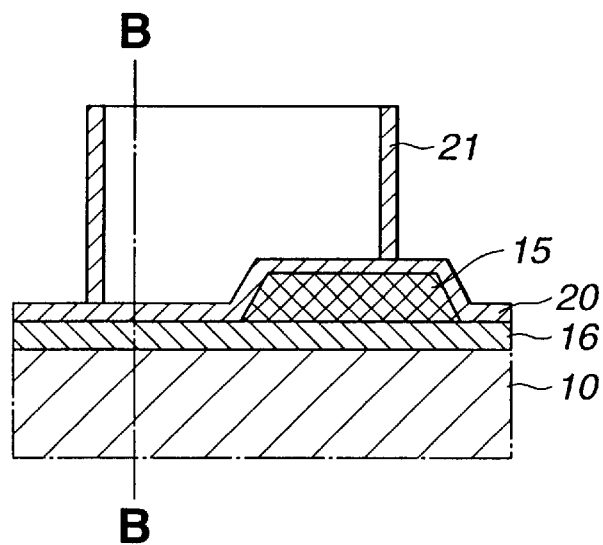

Referring firstly to FIG. 3, when forming the upper layer pole 14a, firstly a plating underlay film 20 is formed on the entire surface where the upper layer pole 14a is to be formed.

Then, a frame of photoresist 21 is formed on the plating underlay film 20. The frame of photoresist 21 has a frame-like form whose internal profile substantially agrees with the profile of the upper layer pole 14a. The frame of the photoresist 21 is formed at a position where an end thereof is placed on the depth limiting film 15.

Figure 4A:
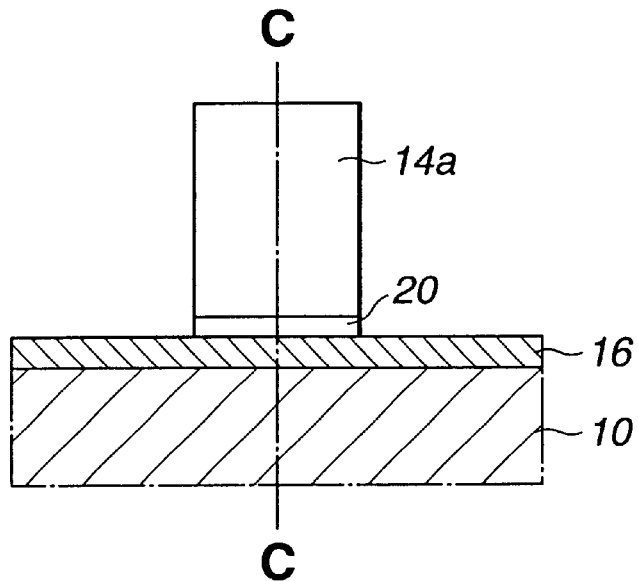
FIG. 4 is schematic views of the thin film magnetic head of FIG. 1, illustrating the upper layer pole formed in the upper layer pole forming step, of which (a) is a view seen from the sliding surface side and (b) is a cross sectional view taken along line C—C in (a).
Figure 4B:
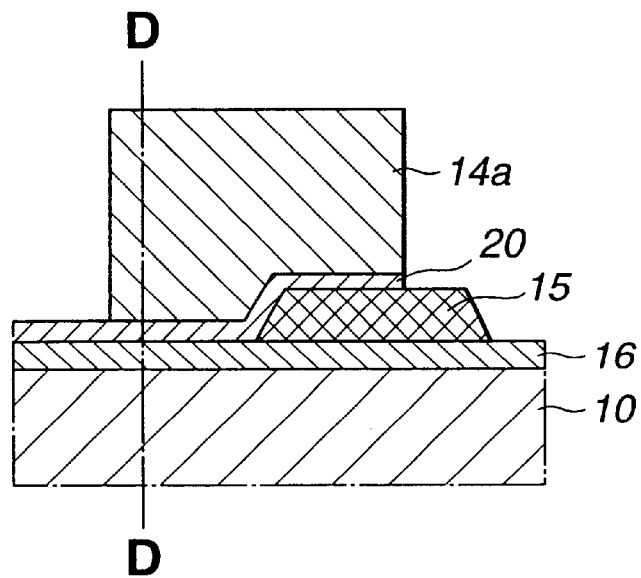

After forming the upper layer pole 14a inside the frame of photoresist 21 by means of a frame plating technique, the upper layer pole 14a is produced by removing the plating underlay film 20 and the frame of photoresist 21 as shown in FIG. 4. Note that the upper layer pole 14a of this embodiment is made of an NiFe alloy.

Figure 5:
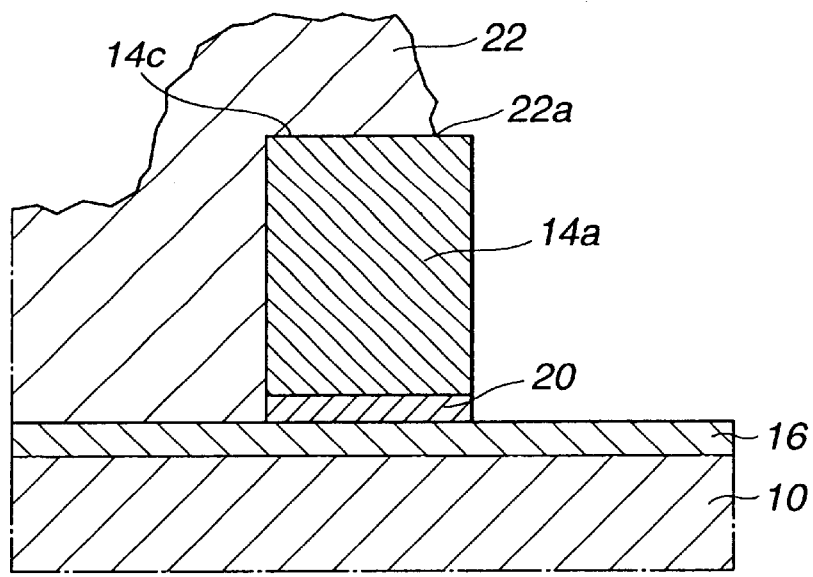
FIG. 5 is a schematic cross sectional view of the thin film magnetic head of FIG. 1, illustrating the upper layer pole forming step where a first resist film is formed on the upper layer pole.

Then, as shown in FIG. 5, a first resist film 22 is formed on one of the lateral sides of the upper layer pole 14a. At this time, the first resist film 22 is formed in such a way that its end 22a is located on the upper surface 14c of the upper layer pole 14a.

Figure 6:
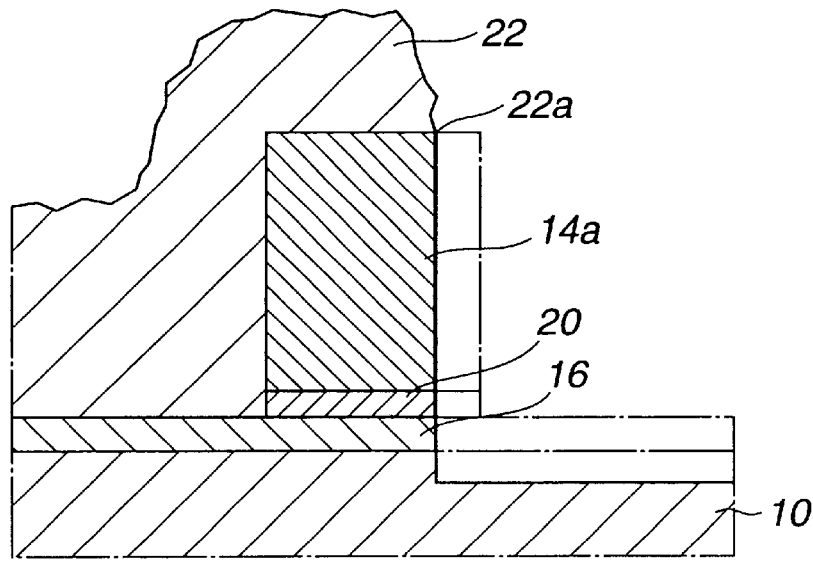
FIG. 6 is a schematic cross sectional view of the thin film magnetic head of FIG. 1, illustrating the upper layer pole forming step where one of the lateral sides of the upper layer pole is etched.

Then, as shown in FIG. 6, the lateral side opposite to the first resist film 22 of the upper layer pole 14a now carrying the first resist film 22 is subjected to an etching process. This first etching step is preferably conducted by means of an ion etching technique, using Ar gas. Then, the finely formed upper layer pole 14a can be trimmed to an enhanced level of precision.

Then, the first resist film 22 is removed.

Figure 7:
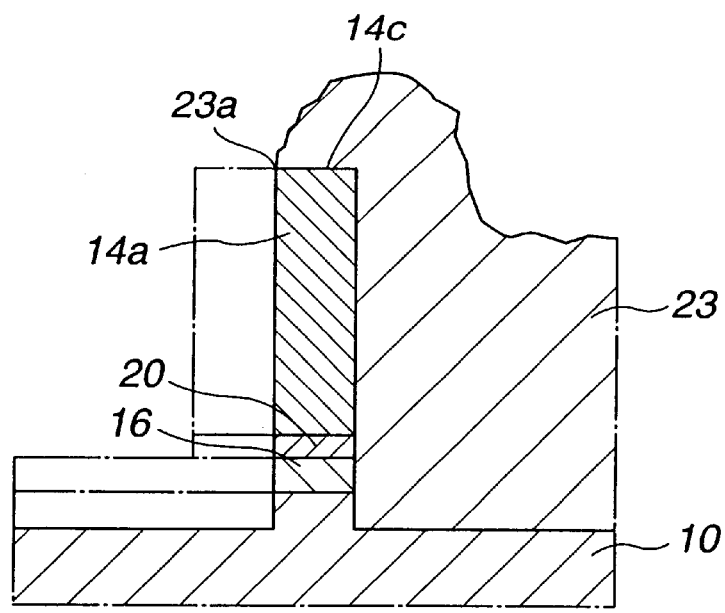
FIG. 7 is a schematic cross sectional view of the thin film magnetic head of FIG. 1, illustrating the upper layer pole forming step where a second resist film is formed on the upper layer pole and the other lateral side is etched.

Thereafter, as shown in FIG. 7, a second resist film 23 is formed on the lateral side of the upper layer pole 14a opposite to the side where the first resist film 22 is formed. As in the case of the first resist film 22, the second resist film 23 is formed in such a way that its end 23a is located on the upper surface 14c of the upper layer pole 14a.

Then, the lateral side of the upper layer pole 14a opposite to the side where the second resist film 23 is formed is subjected to an etching process. As in the case of the first etching step, the second etching step is preferably conducted by means of an ion etching technique, using Ar gas.

Then, the second resist film 23 is removed.

As described above, when forming the upper layer pole 14a, firstly an excessively wide upper layer pole is formed by means of a frame plating technique and the wide upper layer pole 14a is subjected to an etching operation at a lateral side, followed by another etching operation conducted on the opposite lateral side thereof. With this arrangement, the width of the upper layer pole 14a can be finely controlled along the direction of the track. In other words, the upper layer pole 14a can be formed with a high aspect ratio. Additionally, the etching width of the upper layer pole 14a can be regulated by regulating the duration of the first etching step and that of the second etching step so that the profile of the upper layer pole 14a can be formed with an enhanced level of precision.

More specifically, by etching the upper layer pole 14 at a lateral side at a time, the width of the upper layer pole 14a can be processed with a high precision level of 1 µm or less along the direction of the truck. With any conventional technique, it is difficult to process the width of an upper layer pole with a precision of 1 µm.

Thus, the finished thin film head 1 is a magnetic head whose track width is processed with an enhanced level of precision to make the head adapted to high density recording. In other words, such a thin film head can record and reproduce fine magnetic signals. Additionally, since upper layer pole 14a of the thin film head is made to show a track width not greater than 1 µm, the magnetic head can reliably record and reproduce fine magnetic signals than any other conventional thin film magnetic heads.

Additionally, in the above described first and second etching steps, it is preferable that not only the upper layer pole 14a but also the sixth non-magnetic layer 16 and the intermediary magnetic shield layer 10 are subjected to an etching operation to make them show a width same as the upper layer pole 14a. Then, as a result, the thin film head 1 can narrow the leak magnetic field generated in the magnetic gap so that it can record and reproduce fine magnetic signals with an enhanced level of precision.

Still additionally, while the upper layer pole 14a is formed by means of a plating technique in the above description, the present invention is by no means limited to the above described technique of forming the upper layer pole 14a and the upper layer pole 14a may alternatively be formed by means of any of various PVD techniques such as evaporation and sputtering.

Still additionally, in the above described first and second etching steps, the first resist film 22 and the second resist film 23 are used as masks for masking the respective lateral sides of the upper layer pole 14a in the above description, any of various mask materials that are used for ordinary etching processes may be used in place of resist film for the purpose of the invention. Any of various resist films such as photoresist may be used for the purpose of the invention.

Then, a seventh non-magnetic film 17 is formed on the entire surface of the sixth non-magnetic layer 16 now carrying the upper layer pole 14a. After forming the seventh non-magnetic layer 17, it is subjected to a polishing operation to expose the upper layer pole 14a buried in the seventh non-magnetic layer 17 and make the upper layer pole 14a and the seventh non-magnetic layer 17 flush with each other. As a result, the upper layer pole 14a is buried in the seventh non-magnetic layer 17 and hence the surfaces of the components formed in the subsequent steps can be flattened and smoothed. Then, the components can be processed with an enhanced level of precision.

Then, a thin film coil 12 is formed on the seventh non-magnetic layer 17 by using an electrically conductive material. More specifically, the thin film coil 12 is typically made of a conductive material such as Cu and formed by sputtering. Additionally, the thin film coil 12 is made to show a spiral profile having substantially its center located at the abutting area of the back yoke 14b, which will be described hereinafter, and the intermediary magnetic shield layer 10.

Then, an eighth non-magnetic layer 13 is formed to cover the thin film coil 12 and subsequently the eighth non-magnetic layer 13 is removed from a substantially central area of the thin film coil 12 having a spiral profile. As a result, the back yoke 14b, which will be described hereinafter, and the intermediary magnetic shield layer 10 come to be magnetically connected with each other.

Then, a back yoke 14b is formed on the upper layer pole 14a. The back yoke 14b is made of a material showing excellent soft magnetic characteristics and typically formed by means of an appropriate film forming technique such as sputtering. The back yoke 14b is formed so as to be held in contact with the upper layer pole 14a and abut the intermediary magnetic shield layer 10 in a substantially central part of the thin film coil 12 having a spiral profile. As a result, the magnetic core of the magnetic head 1 comes to be constituted by the intermediary magnetic shield layer 10, the upper layer pole 14a and the back yoke 14b. The recording head of the thin film head 1 is produced as the thin film coil 1 is spirally wound around the abutting section of the back yoke 14b defining the back gap of the magnetic core and the intermediary magnetic shield layer 10.

In the process of manufacturing the thin film head 1, after laying the component layers of the head element on the substrate to form a multilayer structure in a manner as described above, the substrate is cut to produce individual thin film heads 1 formed thereon so as make each thin film head 1 show the designed profile. Preferably, the large number of thin film heads 1 are formed to show a matrix arrangement on the substrate. Then, as the large number of thin film heads 1 are manufactured at the same time in a single thin film forming process to dramatically improve the manufacturing efficiency.

As described above, a method of manufacturing a thin film head 1 according to the invention can form and trim the profile of the upper layer pole 14a that limits the track width by means of the above described thin film processing technique to remarkably improve the reproducibility and the level of precision.

Figure 8:
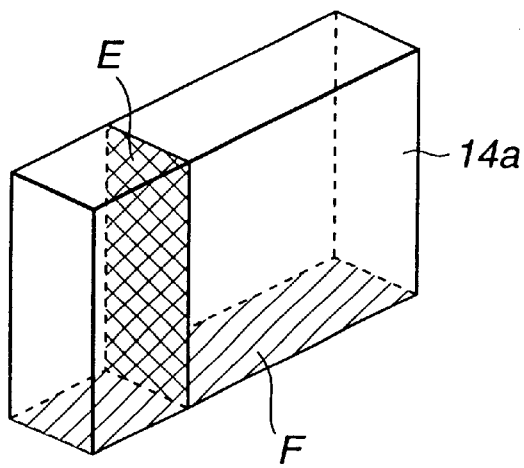
FIG. 8 is a schematic perspective view of an upper layer pole that can be used for the thin film magnetic head of FIG. 1.
Figure 9:
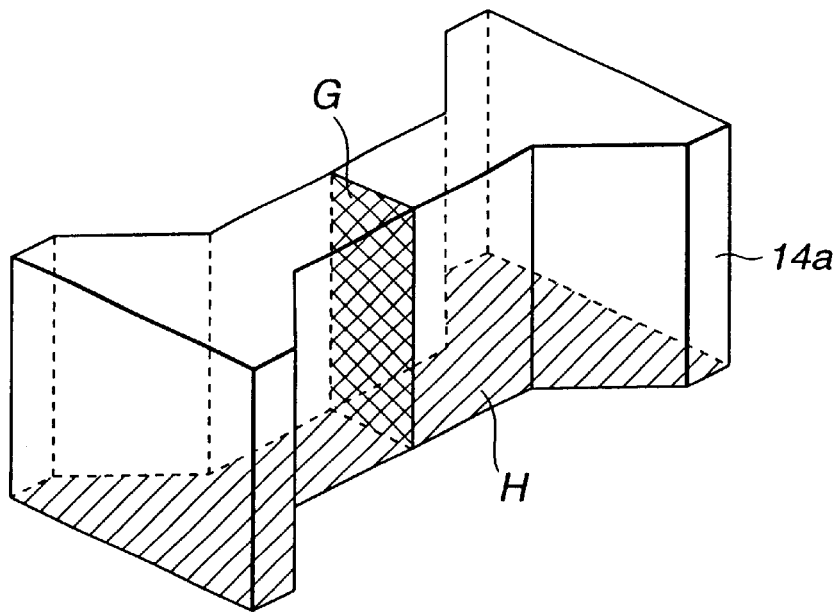
FIG. 9 is a schematic perspective view of another upper layer pole that can be used for the thin film magnetic head of FIG. 1.

Additionally, the profile of the upper layer pole 14a is not limited to the above described one. For example, the upper layer pole 14a may alternatively have the profile of a substantially rectangular column as shown in FIG. 8 or that of an H-beam as shown in FIG. 9. Note that, in FIGS. 8 and 9, regions E and G and regions F and H are respectively those exposed to the sliding surface of the finished thin film head 1 and those bonded to the corresponding profiled surface in the process of forming the latter.

In the process of forming the upper layer pole 14a, the area with which the upper layer pole 14a is bonded to the corresponding profiled surface is increased when the upper layer pole 14a has the profile of a H-beam as shown in FIG. 9 than when it has the profile of a rectangular column as shown in FIG. 8. Then, the bonding strength of the upper layer pole 14a and the corresponding profiled surface can be improved to prevent the risk of separating the upper layer pole 14a and the corresponding profiled surface in subsequent steps including etching steps.

Figure 10:
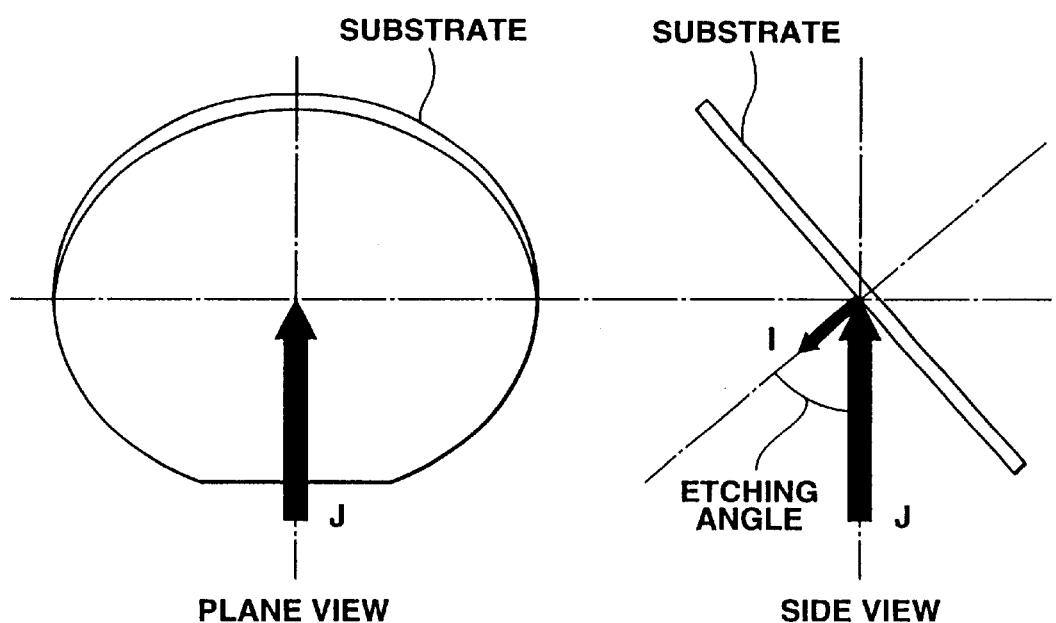
FIG. 10 is an illustration of the etching angle used in the upper layer pole forming step of manufacturing the thin film magnetic head of FIG. 1.
Figure 11:
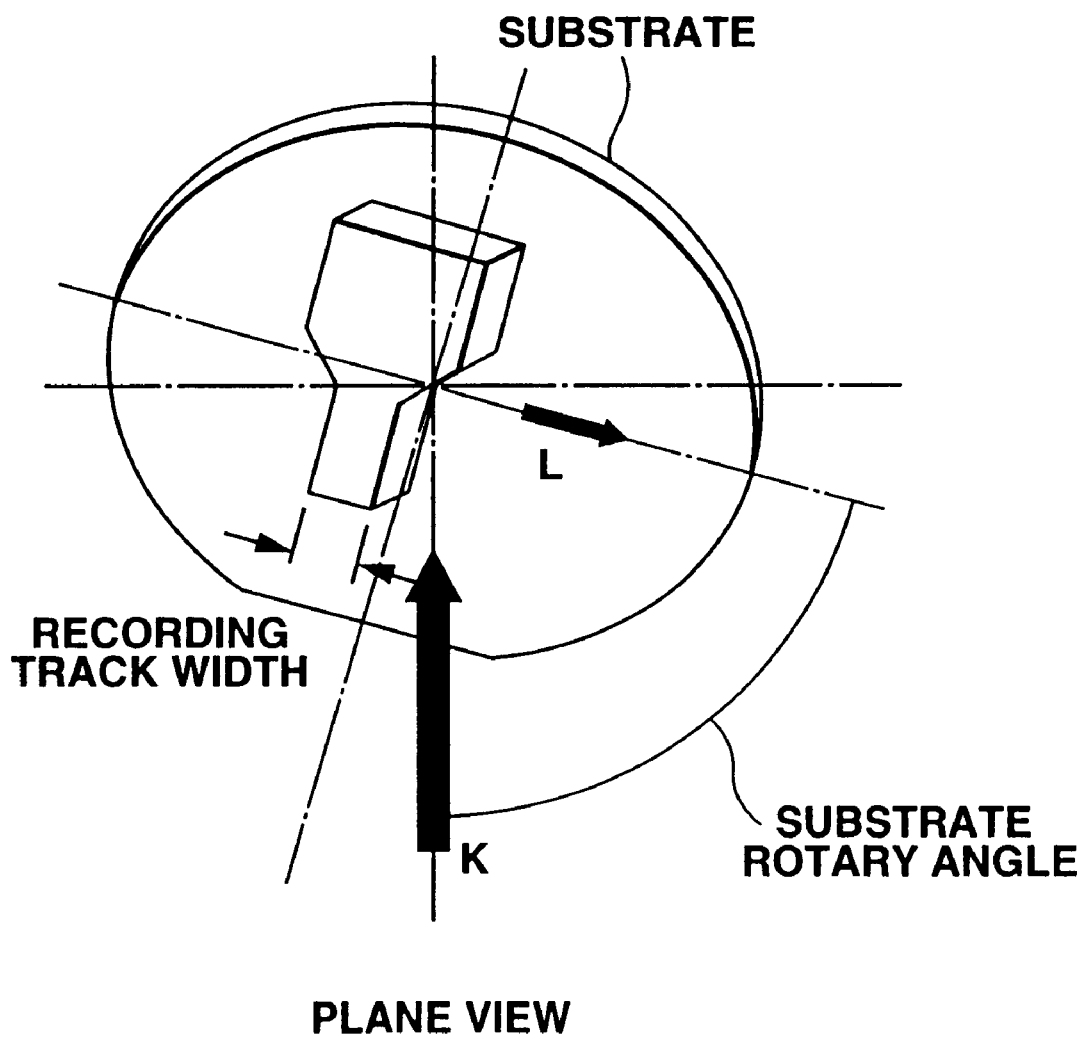
FIG. 11 is an illustration of the substrate rotary angle used in the upper layer pole forming step of manufacturing the thin film magnetic head of FIG. 1.

Now, the etching angle and the substrate rotary angle of the upper layer pole 14a in the above described etching process will be discussed below. In the following description, the etching angle refers to the angle between the normal direction I of the substrate carrying the upper layer pole 14a and the direction J in which etching particles strikes the substrate as shown in FIG. 10, whereas the substrate rotary angle refers to the between the direction K in which the etching particles striking the substrate are projected and the direction L of the track width of the upper layer pole 14a formed on the substrate.

In an experiment, the relationship between the etching rate at the lateral sides of the upper layer pole 14a and the etching angle and the relationship between the etching rate at the lateral sides of the upper layer pole 14a and the substrate rotary angle were observed by forming an upper layer pole 14a by the above described method and etching the upper layer pole 14a by ion beam etching, using Ar gas. Note that the upper layer pole 14a was made of an NiFe alloy.

Figure 12:
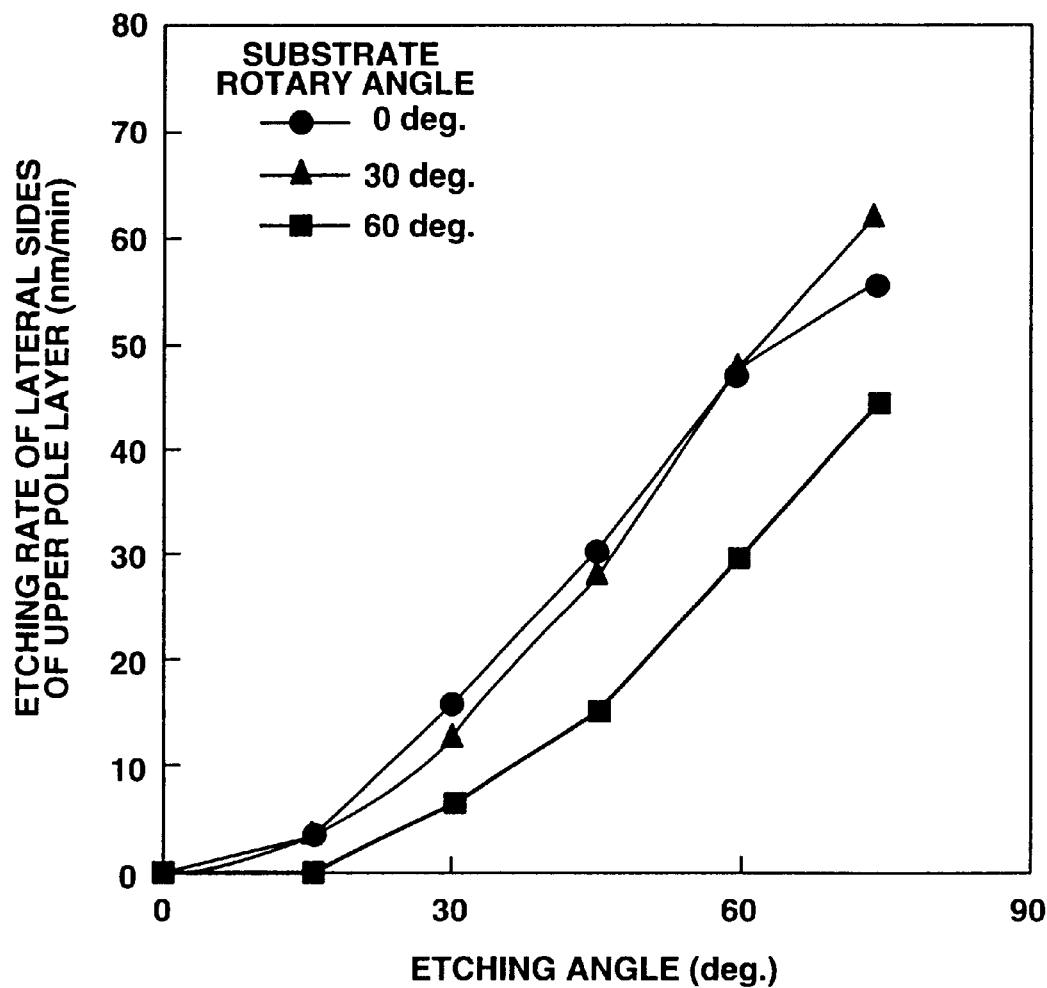
FIG. 12 is a graph illustrating the relationship between the etching angle and the etching rate observed when the substrate rotary angle is held stationary in the upper layer pole forming step of manufacturing the thin film magnetic head of FIG. 1.

FIG. 12 shows the relationship between the etching rate at the lateral sides of the upper layer pole 14a and the etching angle observed when the substrate was held stationary and the etching angle was made to vary. As clearly seen from FIG. 12, the etching rate is reduced as the substrate rotary angle is raised. The etching rate is also reduced as the etching angle is reduced.

Figure 13:
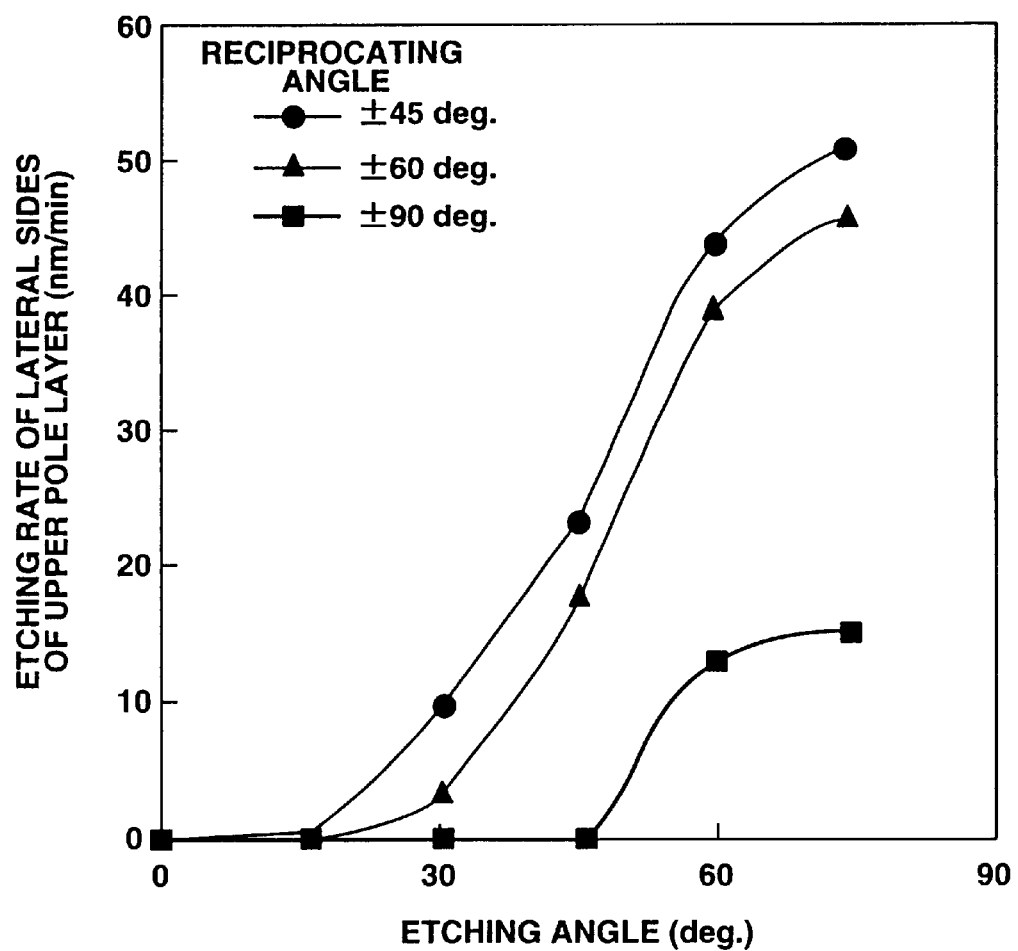
FIG. 13 is a graph illustrating the relationship between the etching angle and the etching rate observed when the substrate rotary angle is reciprocally changed in the upper layer pole forming step of manufacturing the thin film magnetic head of FIG. 1.

FIG. 13 shows the relationship between the etching rate at the lateral sides of the upper layer pole 14a and the etching angle when the substrate angle rotary angle was reciprocatingly changed. As clearly seen from FIG. 13, the etching rate is reduced as the reciprocating angle of the substrate rotary angle is raised. Particularly, the etching rate is extremely reduced when the reciprocating angle of the substrate rotary angle is brought close to 90°.

From FIGS. 12 and 13, is will be appreciated that the etching angle is preferably held between 15° and +75° when etching the upper layer pole 14a. Additionally, it will be appreciated that the substrate rotary angle is preferably held between −60° and +60° regardless if the substrate is held stationary or reciprocatingly rotated for the etching operation.

What is claimed is:

1. A method of manufacturing a thin film magnetic head by sequentially forming at least a lower core layer, a non-magnetic layer and an upper core layer having an upper layer pole defining the track width and subsequently forming a magnetic gap between said lower core layer and said upper layer pole, said method comprising:

an upper layer pole forming step of forming a lower core layer and a non-magnetic layer on a substrate and forming an upper layer pole thereon with a profile wider than the designed track width;

a first etching step of forming a first mask covering one of the lateral sides of said upper layer pole along the track and etching the other lateral side exposed from the mask; and a second etching step of forming a second mask covering the lateral side etched in said first etching step and etching the lateral side opposite to it;

said upper layer pole being made to have the intended track width.

2. A method of manufacturing a thin film magnetic head according to claim 1, wherein the track width of said upper layer pole is profiled to less than 1 μm in said first and second etching steps.

3. A method of manufacturing a thin film magnetic head according to claim 1, wherein said non-magnetic layer and said lower core layer forming the profiled surface of said upper layer pole are also etched in said first and second etching steps.

4. A method of manufacturing a thin film magnetic head according to claim 3, wherein said non-magnetic layer is etched in said first and second etching steps, and said non-magnetic layer is made of $SiO_2$.

5. A method of manufacturing a thin film magnetic head according to claim 1, wherein an ion etching technique is used in said first and second etching steps.

6. A method of manufacturing a thin film magnetic head according to claim 5, wherein said etching operation is conducted with an etching angle between 15° and 75° in said first and second etching steps.

7. A method of manufacturing a thin film magnetic head according to claim 5, wherein said etching operation is conducted with a substrate rotary angle between −60° and +60°, while holding said substrate stationary in said first and second etching steps.

8. A method of manufacturing a thin film magnetic head according to claim 5, wherein said etching operation is conducted with a substrate rotary angle between −60° and +60°, while reciprocatingly rotating said substrate in said first and second etching steps.

* * * * *